(12) United States Patent
Kodama et al.

(10) Patent No.: US 7,196,826 B2
(45) Date of Patent: Mar. 27, 2007

(54) IMAGE PROCESSING DEVICE AND IMAGE PROCESSING SYSTEM

(75) Inventors: Mari Kodama, Ebina (JP); Ryuichi Ishizuka, Ebina (JP); Yasushi Nishide, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1011 days.

(21) Appl. No.: 10/274,407

(22) Filed: Oct. 21, 2002

(65) Prior Publication Data

US 2003/0179395 A1 Sep. 25, 2003

(30) Foreign Application Priority Data

Mar. 19, 2002 (JP) ............................. 2002-076857

(51) Int. Cl.
 *H04N 1/04* (2006.01)
(52) U.S. Cl. ................... 358/474; 358/1.9; 358/518; 358/3.23; 358/2.1; 347/234; 345/150; 348/148
(58) Field of Classification Search ................ 358/474, 358/1.9, 3.23, 2.1, 518, 1.15, 501; 347/234; 345/150, 435; 348/148
See application file for complete search history.

(56) References Cited

U.S. PATENT DOCUMENTS

| | | | |
|---|---|---|---|
| 6,128,001 A * | 10/2000 | Gonsalves et al. ........... 345/589 |
| 6,215,512 B1 * | 4/2001 | Imaizumi et al. ............ 347/234 |
| 6,344,853 B1 * | 2/2002 | Knight ....................... 345/629 |
| 6,408,156 B1 * | 6/2002 | Miyazaki et al. ........... 399/301 |
| 6,721,062 B1 * | 4/2004 | Sawada et al. .............. 358/1.9 |
| 2001/0012110 A1 * | 8/2001 | Kanamori .................... 358/1.9 |
| 2002/0118210 A1 * | 8/2002 | Yuasa et al. ................. 345/589 |
| 2002/0167589 A1 * | 11/2002 | Schofield et al. ........... 348/148 |

FOREIGN PATENT DOCUMENTS

JP  A 2000-013627  1/2000

* cited by examiner

*Primary Examiner*—Douglas Q. Tran
*Assistant Examiner*—Negussie Worku
(74) *Attorney, Agent, or Firm*—Oliff & Berridge, PLC

(57) ABSTRACT

An image processing device which carries out processing for composing a first image (a color patch image for printing simulation) and a second image (a color patch image for printer management) with image data of a print job, and printing-out. When image data is received from an image processing terminal, image data of a first image and a second image are generated by first and second image generating sections. A first image composing section composes image data of an object of printing and first image data. A color correcting section carries out color correction on the composed image. A second image composing section composes the second image and an image which has been composed by the first image composing section and color corrected. In this way, appropriate printing simulation using an output device such as a printer is possible.

20 Claims, 8 Drawing Sheets

F I G. 1
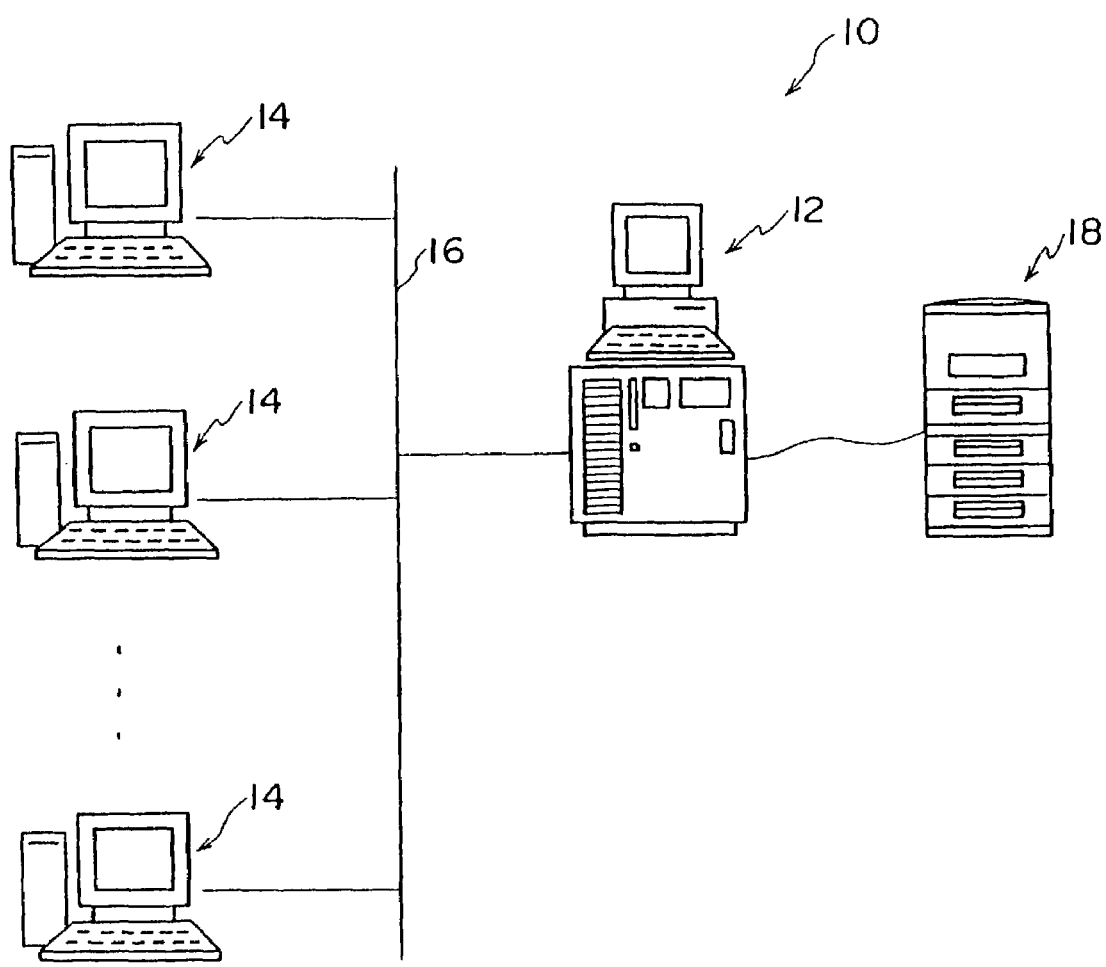

IMAGE PROCESSING DEVICE AND IMAGE PROCESSING SYSTEM

BACKGROUND OF THE INVENTION

1. Field of the Invention

The present invention relates to an image processing device which carries out image processing on the basis of drawing commands or image data prepared by various applications.

2. Description of the Related Art

DTP (desktop publishing) has come to be widely used as a way of digitizing in the field of printing processing. In DTP, at a processing device such as a personal computer or a work station or the like, a page layout is prepared by carrying out preparation, manipulation, editing, and the like of an image. On the basis of this page layout, preparation of a film for exposing a printing plate is carried out (CEPS), or a press plate for printing is prepared by directly writing onto a printing plate (CTP: computer-to-plate).

When proofreading and the like are carried out before printing by using an actual press plate, a page layout displayed on a monitor is printed out by a print-out device such as a page printer or the like by using the WYSIWG function or the like.

A color laser printer or the like is used when the work of proofreading of a color image and color proofreading are carried out. Further, when color proofreading work is carried out, there are cases in which a special color printer, which is exclusively used for confirming tints, is used.

A color printer used in the proofreading and color proofreading work has an image processing function which can simulate the tints in an actual plate-making and printing environment. Further, there are color printers which can carry out adjustment and switching such that a plurality of plate-making and printing environments can be simulated.

On the other hand, when carrying out printing by using an actual press plate, in order to manage the printed output, a color management image, which is called a color patch or a scale for management (and which will hereinafter be called "color patch"), is printed in the margin. By measuring the densities of the respective colors of the color patch by using a densitometer, it can be confirmed whether or not colors have been reproduced appropriately.

Further, with color printers as well, there are cases in which color patches are printed in order to manage the printed output. When printing-out of a print simulation using a color printer is carried out, in order to manage the printed output and to grasp the simulation characteristics, there are cases in which a color patch is printed-out in the margin by using a color patch printing function of the printer.

A color patch used at the time of carrying out printing simulation is used in management and in comparison with printed output obtained by using a press plate. A color printer outputs a color patch on which image processings have been carried out in order to simulate the plate-making and printing environment.

On the other hand, changes and deterioration in the mechanical characteristics of a color printer, which are due to differences between individual color printers, replacement of parts, and fluctuations over time, appear in the output from a color printer. The precision of the printing simulation of the plate-making and printing environment deteriorates due to such changes and deteriorations.

However, the aforementioned color patch is subjected to image processing for the printing simulation, and the changes in the characteristics of the color printer cannot be directly grasped. Further, when the color printer is used when the simulation is switched to a different printing environment, a different color patch which has been subjected to different image processings is outputted each time. Thus, the color patch cannot be used to grasp changes in the characteristics of the color printer itself. As a result, an improvement in the precision of the printing simulation cannot be achieved.

SUMMARY OF THE INVENTION

The present invention has been conceived of in light of the above-described circumstances, and an object of the present invention is to provide an image processing device which enables appropriate printing simulation corresponding to the printing environment to be carried out by using a print-out device such as a color printer or the like.

In order to achieve the above-described object, one aspect of the present invention is an image processing device receiving data of an image which is an object of printing, and subjecting the image data to processing for printing, said image processing device comprising: first image generating means for generating first image data of a first image having a predetermined pattern; second image generating means for generating second image data of a second image having a predetermined pattern; first image composing means for composing the image data of the object of printing and the first image data; color correcting means for carrying out color correction on the image data of the object of printing and the first image data; and second image composing means for composing image data, which have been composed by the first image composing means, and the second image data.

At least one of the image data of the object of printing, the first image data and second image data may be drawing data expressed by drawing commands. Therefore, hereinafter, when the phrase "image data" appears by itself, the image data may include any kind of image data that is capable of representing an image, such as raster data, drawing data, drawing commands, and the like.

The first image is an image for management for printing simulation, and the second image is an image for management of an output device. All of the image data may be drawing data expressed by drawing commands.

In accordance with the above aspect of the invention, a management image for printing simulation, which is generated by the first image generating means, is composed by the first image composing means. The second image composing means composes a management image for an output device, which is generated by the second image generating means, with the image which has been composed by the first image composing means.

In this way, the management image for printing simulation and the management image for an output device, which are generated by the first image generating means and the second image generating means, are composed with an image which is based on a drawing command or image data inputted from the image processing terminal, and outputted.

At this time, color correction is carried out by the color correcting means on the management image for printing simulation. However, color correction is not carried out on the management image for an output device.

Accordingly, by making the management image for printing simulation be a color patch for simulation for printed output at the time of carrying out color proofreading work or the like, and by making the management image for an output device be a color patch for management of an output device such as a printer, appropriate printing simulation which corresponds to the printing environment is possible.

Note that, in the present invention, one type of management image may be used, and the first image generating means may further include a color correcting means, and the management image may be subjected to color correction in accordance with the printing environment which is to be simulated by printing.

In the present invention, it is possible for the images to be composed after the color correcting means carries out color correction on the image generated by the first image generating means and the color correcting means carries out color correction on the image which is based on the drawing command or the image data inputted from the processing terminal.

Namely, after the first image composing means composes the image data of the object of printing and the first image data generated by the first image generating means, the color correcting means may carry out color correction on the composed image data. Or, after the color correcting means carries out color correction on each of the image data of the object of printing and the first image data, the first image composing means may compose the image data of the object of printing and the first image data which have been subjected to color correction.

Another aspect of the present invention is an image processing system comprising: an image processing terminal providing image data of an image which is an object of printing; and an image processing device receiving the image data from the image processing terminal, and subjecting the image data to processing for printing, wherein the image processing device includes: first image generating means for generating first image data of a first image having a predetermined pattern; second image generating means for generating second image data of a second image having a predetermined pattern; first image composing means for composing the image data of the object of printing and the first image data; color correcting means for carrying out color correction on the image data of the object of printing and the first image data; and second image composing means for composing image data, which have been composed by the first image composing means, and the second image data.

In the above-described aspect, the first and second image generating means can carry out image generation on the basis of the settings of an image generation instructing means provided at the image processing terminal. The first and second image composing means can carry out image composition on the basis of the settings of an image composing instructing means provided at the image processing terminal.

In this way, setting of a printing simulation corresponding to the printing environment is possible at the image processing terminal.

Moreover, in the present invention, the first and second image generating means may be storing means for storing drawing commands or image data of a management image for printing simulation and a management image for an output device which are set in advance.

Yet another aspect of the present invention is an image processing system comprising: an image processing terminal providing image data of an image, which is an object of printing, the image processing terminal including first image generating means for generating first image data of a first image having a predetermined pattern, and second image generating means for generating second image data of a second image having a predetermined pattern; and an image processing device receiving the image data from the image processing terminal, and subjecting the image data to processing for printing, wherein the image processing terminal sends the first and second image data to the image processing device together with the image data of the object of printing, and the image processing device receives the first and second image data together with the image data of the object of printing and has first image composing means for composing the image data of the object of printing and the first image data; color correcting means for carrying out color correction on the image data of the object of printing and the first image data; and second image composing means for composing image data, which have been composed by the first image composing means, and the second image data.

In the above described aspect, the first and second image generating means are provided at the image processing terminal, and the first and second image composing means carry out image composition on the basis of drawing commands or image data of the management image for printing simulation and a management image for an output device which are inputted from the processing terminal.

Namely, the management image for printing simulation and the management image for an output device may be stored in advance in the storing means, or may be generated at the image processing terminal. In this way, generation of the management image for printing simulation and the management image for an output device is easy, and an appropriate management image corresponding to the printing environment can be used. Note that a plurality of management images may be stored in the storing means or the image processing terminal, and any thereof may be selectively used.

In the present invention, the color correcting means may carry out color correction of a predetermined region of the image which has been composed by the first and second image composing means.

Namely, for an image which is composed by the second image composing means without any color correction being carried out, color correction may be carried out on regions other than a second color management image (the management image for an output device).

BRIEF DESCRIPTION OF THE DRAWINGS

FIG. 1 is a schematic structural diagram of a network applied to an embodiment of the present invention.

DESCRIPTION OF THE PREFERRED EMBODIMENTS

Figure 2:
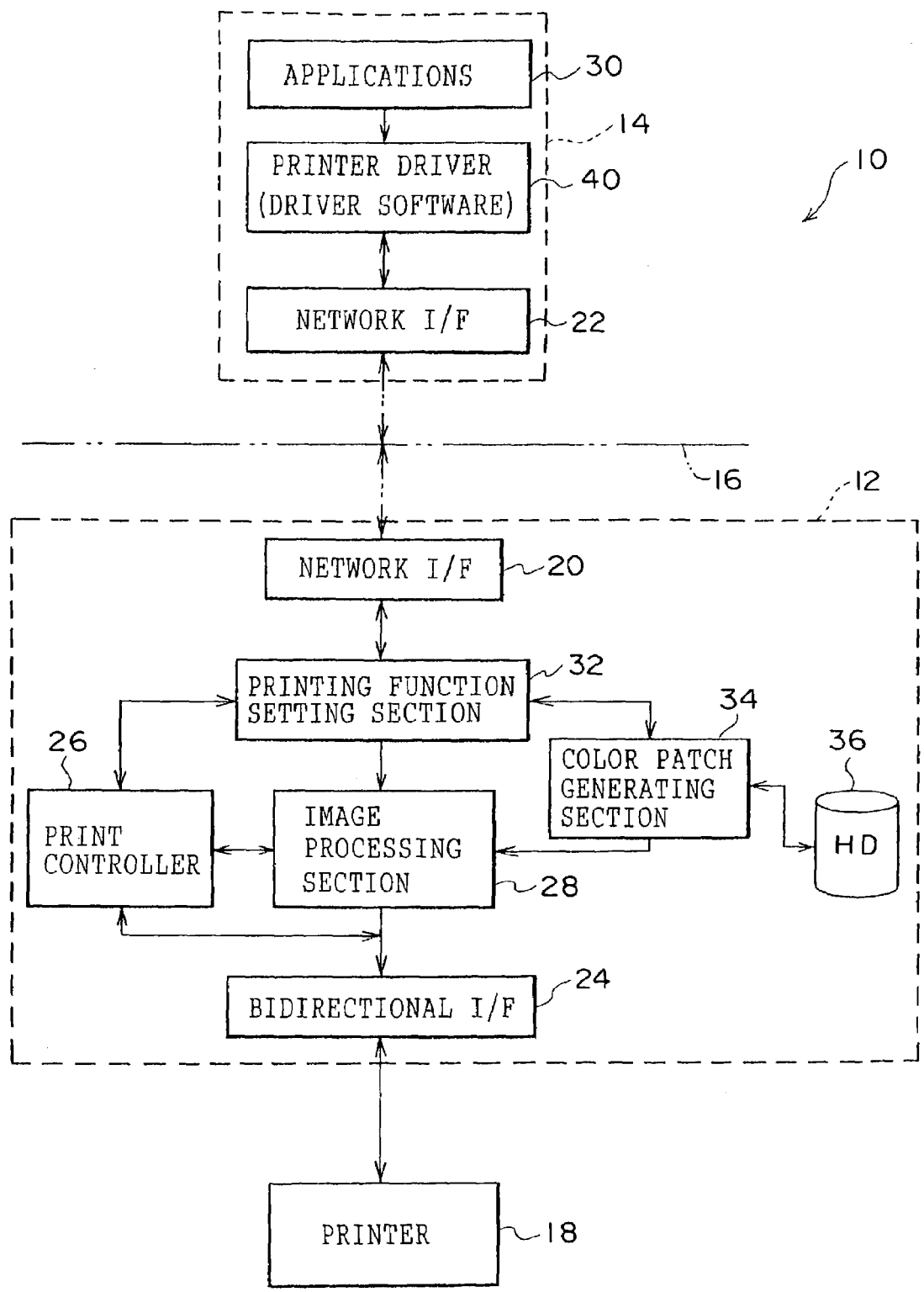
FIG. 2 is a schematic structural diagram of a print server to which the present invention is applied.

Hereinafter, embodiments of the present invention will be described with reference to the drawings. FIG. 1 shows the schematic structure of a network 10 applied to the present embodiment. In the network 10, a print server 12, which is provided as the image processing device to which the present invention is applied, and a plurality of client terminals 14, which are provided as image processing terminals, are connected as a network via a communication line 16.

A printer 18 serving as a print-out device is connected to the print server 12. When the print server 12 receives a print job outputted from the client terminal 14, the printer 18 carries out printing output corresponding to the print job. Hereinafter, explanation will be given of a case in which the image processing device is used as the print server. However, the image processing device of the present invention is not limited to the same, and may carry out image processing while being provided at any of various types of intermediate servers, such as a file server or the like, connected on a network to the client terminals 14.

As shown in FIG. 2, network interfaces (network I/Fs) 20, 22 are provided at the print server 12 and the client terminal 14. The print server 12 and the client terminal 14 are connected to the communication line 16 via these network I/Fs 20, 22. Further, the print server 12 is provided with a bidirectional interface (bidirectional I/F) 24 such as an Ethernet (R), and is connected to the printer 18 via the bidirectional I/F 24. There may be a plurality of the printers 18 connected to the print server 12, and a plurality of bidirectional I/Fs 24 or a plurality of types of bidirectional I/Fs 24 may be used.

A LAN (local area network) connection, such as Apple Talk, Ethernet (R) (e.g., Ether Talk or the like), may be used as the network connection between the plural client terminals 14 and the print server 12, or a WAN (wide area network) connection may be used. Namely, connection in accordance with an arbitrary network protocol can be used.

The print server 12 can be structured by, for example, adding a PCI board equipped with predetermined functions to a personal computer (PC). Or, the print server 12 may be provided with an input device such as a keyboard, a mouse or the like, and a display device such as a CRT display, an LCD display or the like, and with a WYSIWYG function which processes an image displayed on the display device and prints-out the displayed image.

A print controller 26, which controls the printer 18, and an image processing section 28 are provided at the print server 12. The image processing section 28 carries out RIP processing which generates raster data on the basis of job data such as drawing data or image data inputted as a print job from the client terminal 14.

At the print server 12, the inputted print job is stored in a processing queue. The print job stored in the processing queue is read-out in order, and image processing (RIP processing) is carried out. The data, which has been subjected to image processing and is to be outputted to the printer 18 (the raster data), is stored in a printing queue, and is outputted in order to the printer 18 from the printing queue. Further, the print server 12 has the usual structure in which jobs for which printing processing has not been designated and jobs for which printing processing cannot be executed are stored and held in a holding queue. Note that the print server 12 can utilize any of various, conventionally known structures, and detailed description thereof will be omitted in the present embodiment.

The client terminal 14 is equipped with various types of applications 30, and carries out document preparation, and image processings such as preparation, manipulation, editing and the like of images, and the like by using the applications 30. Due to the client terminal 14 transmitting prepared image data or drawing data and various types of processing instructions to the print server 12 as a print job, the print server 12 carries out the designated image processings on the print job, and outputs it to the printer 18. A printed matter corresponding to the print job is thereby obtained.

A printing function setting section 32 is provided at the print server 12. When the print server 12 receives a job such as a print job or the like, the printing function setting section 32 carries out setting of the various types of printing functions designated by the print job. In the print server 12, various types of conventionally known printing functions can be set. The printing function setting section 32 judges the printing functions designated by the print job and carries out settings such that the respective printing functions are executed at the image processing section 28 and the printer controller 26. Detailed description thereof is omitted in the present embodiment.

A color patch generating section 34, which generates color patches which are a management image for printing simulation and a management image for the output device, is provided at the print server 12. Further, an HD 36 serving as a storing means is provided at the print server 12.

At the print server 12, a color patch is prepared in advance and stored in the HD 36. When print-out of a color patch is designated, the color patch generating section 34 reads-out the color patch stored in the HD 36 and outputs it to the image processing section 28.

In the present embodiment, as an example, description is given of a case in which image data of color patches prepared in advance or drawing commands for forming color patches are stored in the HD 36. However, the present invention is not limited to the same, and the color patch generating section 34 may generate drawing commands or image data of the color patches. Or, in the client terminal 14, drawing commands or image data of the color patches may be prepared and stored. In this case, the color patch generating section 34 may extract the drawing commands or the image data of the color patches from the print job, and output them to the image processing section 28 at a predetermined time.

At the image processing section 28, when print-out of the color patches is designated, raster data, which is composed with the color patches, is outputted at the time of forming raster data corresponding to the image data or the drawing command of the print job.

Figure 3:
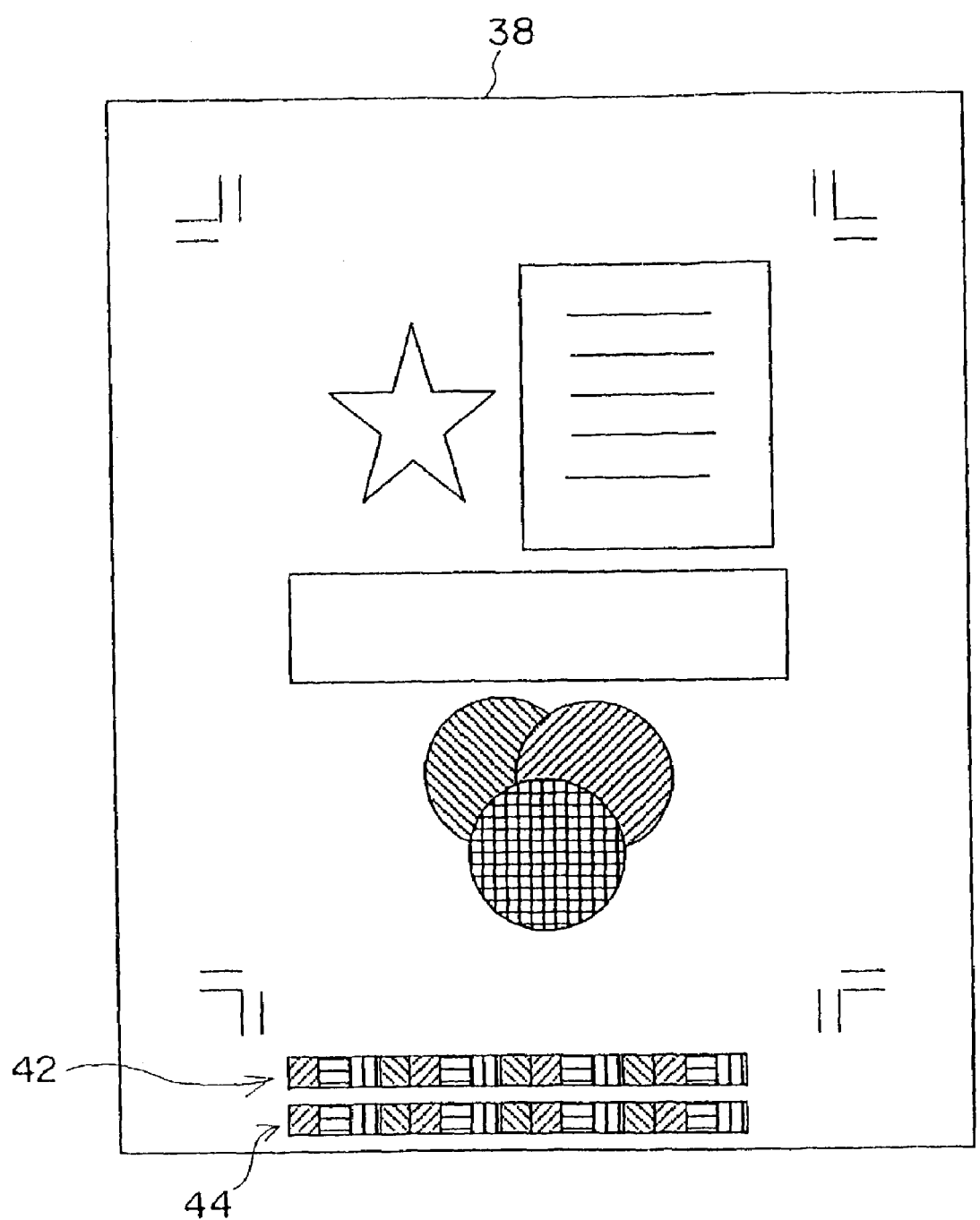
FIG. 3 is a schematic structural diagram of a recording paper on which are printed a color patch for printing simulation and a color patch for printer management.

As shown in FIG. 3, at the print server 12, at least two types of color patches 42, 44 are printed on a recording sheet 38 which is outputted from the printer 18. Among these, the color patch 44 is formed so as to be able to be used for managing the printer 18 (i.e., to be used as a management image for the output device, hereinafter called "color patch 44 for printer management" or "color patch 44"). The color patch 42 can be used for managing the printing environment when obtaining a print-out for printing simulation by using the printer 18 in order to carry out color proofreading work or the like (i.e., can be used as a management image for printing simulation, hereinafter called "color patch 42 for printing simulation" or "color patch 42").

Thus, at the color patch generating section 34, color correction and the like, which are set in advance on the basis of the printing environment to be simulated, are carried out on the image data which is to become the color patch 42 for printing simulation.

Further, at the image processing section 28, color correction and the like, which are set in advance on the basis of the characteristics of the printer 18, are carried out on the color patch 42 for printing simulation, in the same way as on the image data or the drawing command inputted from the client terminal 14.

Moreover, at the image processing section 28, the color patch 44 for printer management is outputted without being subjected to color correction.

Driver software 40 (a printer driver), which is for setting the various types of printing functions provided at the print server 12, is built-in into each of the client terminals 14. At the client terminal 14, when a request for printing processing or the like of the drawing command or the image data prepared by the applications 30 is carried out, settings of the various printing functions provided at the print server 12 can be carried out by using the driver software 40.

At the driver software 40, it is possible to carry out the application of and settings for the color patches 42, 44 when a drawing command or image data, which has been prepared and has undergone processings such as manipulation, correction and the like by the applications 30, is to be outputted as a print job.

Figure 4:
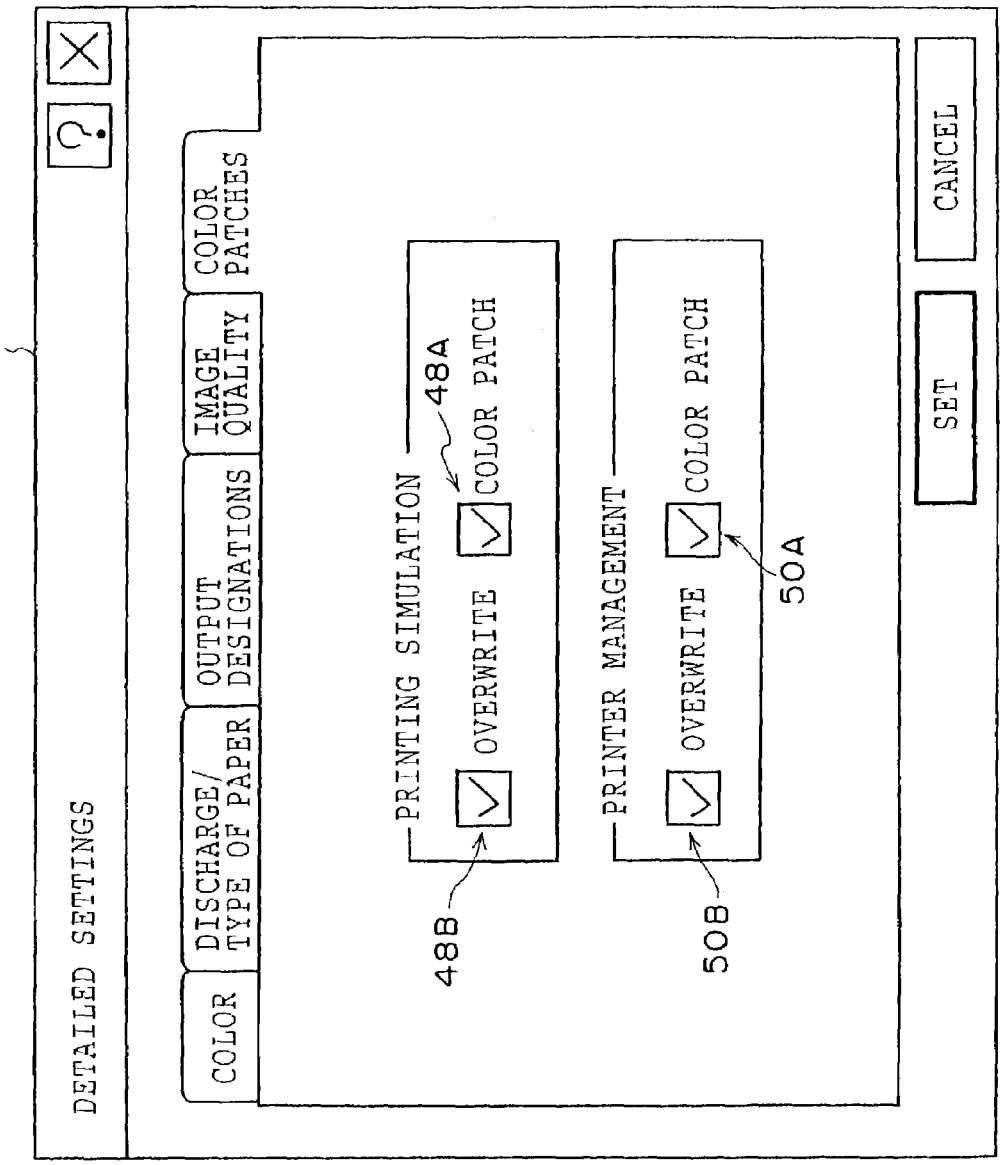
FIG. 4 is a schematic structural diagram of a setting dialog box showing an example of a user interface provided at a client terminal.

FIG. 4 shows an example of a user interface used at the time of carrying out the application of the color patches 42, 44 and settings for the color patches 42, 44 at the client terminal 14. A setting dialog box 46 is displayed by selecting detailed settings when, for example, print settings are carried out. In the setting dialog box 46, the color patch 42 for printing simulation and the color patch 44 for printer management can be set individually.

When the color patch 42 for printing simulation is to be formed on the recording paper 38, a mark is placed in a check box 48A. When the color patch 42 for printing simulation is to be overwritten, i.e., superposed on the image to be printed-out, a mark is placed in a check box 48B. Further, when the color patch 44 for printer management is to be formed on the recording paper 38, a mark is placed in a check box 50A. When the color patch 44 for printer management is to be overwritten, a mark is placed in a check box 50B.

The user interface is not limited to the same, and an arbitrary structure may be used. Further, although these selections and settings are carried out at the client terminal 14 in the present embodiment, the selections and settings may be carried out at the print server 12.

Hereinafter, a summary of printing processing using the print server 12 on the network 10 will be described.

In the network 10, at the client terminal 14, a drawing command or printing data, which has been subjected to processings such as preparation, manipulation, editing and the like by using the applications 30, is outputted to the print server 12 as a print job.

When the print server 12 receives the job outputted from the client terminal 14, if the job is a print job, reading and setting of the printing functions is carried out at the printing function setting section 32. Further, the image processing section 28 carries out RIP processing for preparing raster data from the image data or the drawing command of the print job.

The raster data prepared at the image processing section 28 is outputted to the printer 18 at a predetermined time. In this way, the printer 18 carries out printing output on the basis of the image data or the drawing command of the print job.

At the client terminal 14, settings for printing the color patch 42 for printing simulation and the color patch 44 for printer management can be carried out by using the driver software 40. Namely, at the client terminal 14, when a print job is to be outputted to the print server 12, settings for the printing of the color patch 42 for printing simulation and the color patch 44 for printer management can be carried out on the setting dialog box 46.

At the print server 12, when printing of the color patch 42 for printing simulation or the color patch 44 for printer management is set, the color patch 42 for printing simulation or the color patch 44 for printer management is formed at a predetermined position of the recording paper 38 at the time when an image based on the image data or drawing command is formed and printed-out on the recording paper 38.

Here, a summary of the processings for forming the color patch 42 for printing simulation or the color patch 44 for printer management on the recording paper 38 will be described. Due to printing of the color patch 42 for printing simulation or the color patch 44 for printer management being set in the print job inputted from the client terminal 14, the color patch generating section 34 reads the image data or the drawing data of the corresponding color patch from the HD 36, and outputs it to the image processing section 28 at a predetermined time.

When printing out the color patch 42 for printing simulation or the color patch 44 for printer management, a method in which the color patch is prepared and used as a file of a drawing command in PostScript format, or a method in which the color patch is prepared and used as raster data, may be used.

Figure 5A:
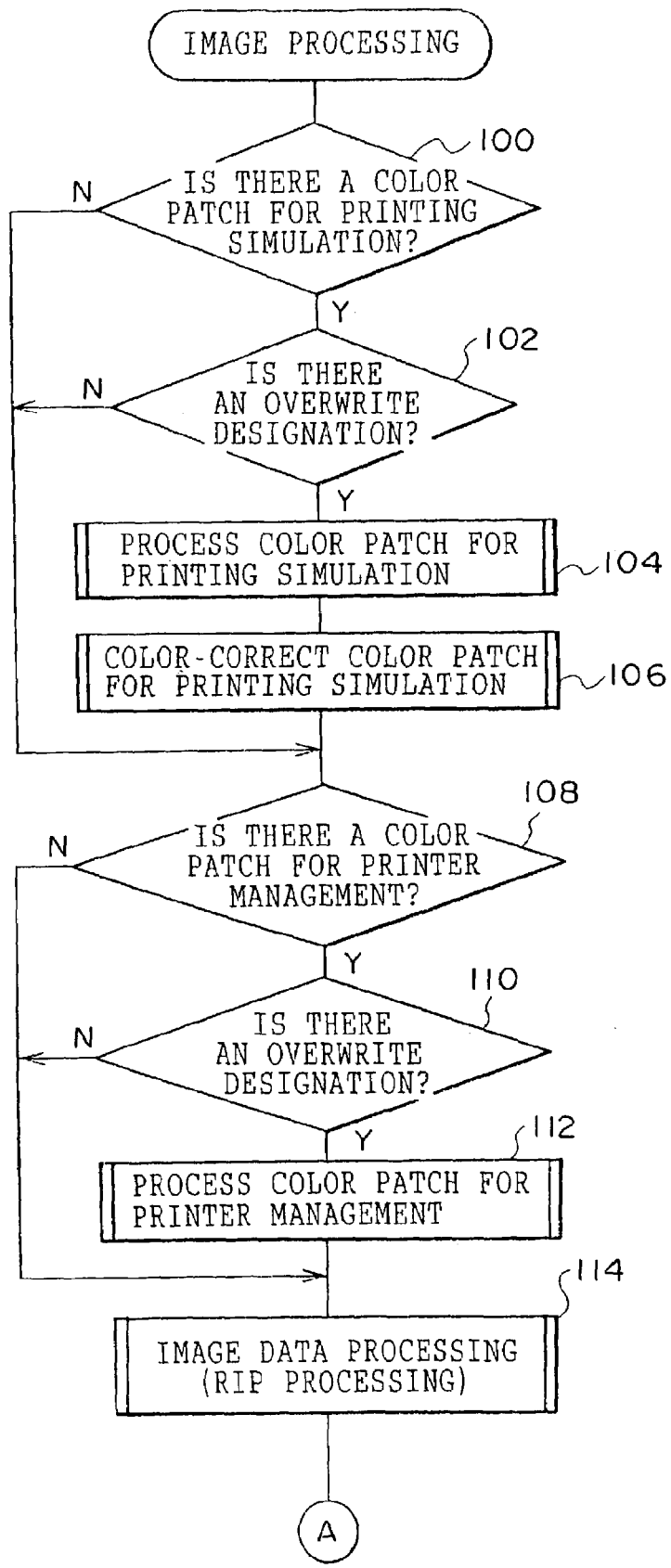
FIGS. 5A and 5B are flowcharts showing a summary of the processings at the time of composing the color patch for printing simulation and the color patch for printer management, which are managed as drawing commands.
Figure 5B:
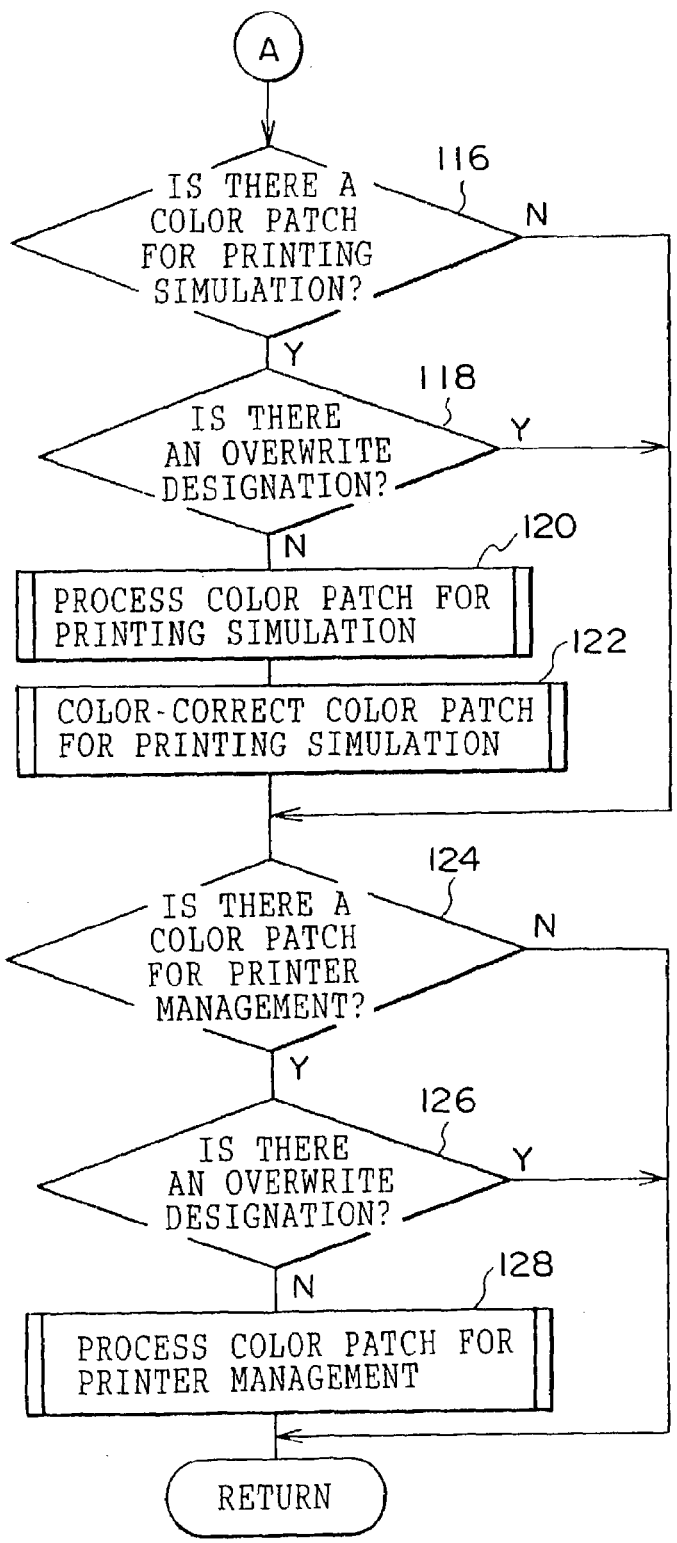

Here, first, an example of image processing at the time of managing the color patch image as a drawing command in PostScript format will be described with reference to FIG. 5A and FIG. 5B.

In this flowchart, first, in step 100, it is confirmed whether or not printing of the color patch 42 for printing simulation has been set (i.e., whether the setting for printing the color patch 42 for printing simulation has been selected). In step 102, it is confirmed whether overwriting has been designated.

At this time, if printing of the color patch 42 for printing simulation has been set and overwriting has been designated, the determinations in steps 100 and 102 are affirmative, and the routine moves on to step 104.

In step 104, a drawing command of the color patch 42 for printing simulation is generated, and is composed with the drawing command for the image data of the print job. Further, in step 106, predetermined color correction is carried out on the composed drawing command. Note that, when the file of the drawing command of the color patch 42 for printing simulation is stored in the HD 36, it may be read-out from the HD 36. When the file of the drawing command of the color patch 42 for printing simulation is inputted from the client terminal 14, this file of the drawing command inputted from the client terminal 14 may be used.

In subsequent step 108, it is confirmed whether or not printing of the color patch 44 for printer management has been set. In step 110, it is confirmed whether there is an overwrite designation for the color patch 44 for printer management. Note that, if printing of the color patch 42 for printing simulation has not been set (the determination in step 100 is negative) or overwriting has not been designated (the determination in step 102 is negative), the routine moves on to step 108.

In this way, when printing of the color patch 44 for printer management has been set and overwriting has been designated, the determinations in steps 108 and 110 are affirmative. The routine moves on to step 112 where a drawing command for the color patch 44 for printer management is generated and is composed with the drawing command of the print job.

In this way, when printing of the color patch 42 for printing simulation or the color patch 44 for printer management has been set and overwriting has been designated, the drawing command of the corresponding color patch is composed with the drawing command of the print job, and the routine moves on to step 114.

In step 114, raster data is generated by carrying out RIP processing on the basis of the drawing command.

Thereafter, in step 116, it is judged whether printing of the color patch 42 for printing simulation has been set. When such a print setting has been made (i.e., when the determination in step 116 is affirmative), it is judged whether overwriting has been designated (step 118). Further, in step 124, when a judgement is carried out as to whether printing of the color patch 44 for printer management has been set and it is determined that printing has been set (i.e., when the determination in step 124 is affirmative), it is confirmed whether overwriting has been designated (step 126).

Here, when printing of the color patch 42 for printing simulation has been set and there is no designation to overwrite (i.e., when the determination in step 116 is affirmative and the determination in step 118 is negative), the image composition of the color patch 42 for printing simulation is not yet completed. Thus, the routine moves on to step 120, and preparation of image data of the color patch 42 for printing simulation (reading-out of the drawing command) is carried out. In step 122, color correction and RIP processing are carried out on this drawing command, and it is composed with the raster data generated on the basis of the image data of the print job.

When printing of the color patch 44 for printer management is set and overwriting is not designated (i.e., when the determination in step 124 is affirmative and the determination in step 126 is negative), the routine moves on to step 128. Generation of the drawing command for the color patch 42 for printing simulation, and RIP processing are carried out. This raster data of the color patch 44 for printer management is composed with the raster data prepared on the basis of the image data of the print job.

When printing of the color patch 42 for printing simulation is not set or overwriting is designated (i.e., when the determination in step 116 is negative or the determination in step 118 is affirmative), the routine moves on to step 124. When printing of the color patch 44 for printer management is not set or overwriting is designated (i.e., when the determination in step 124 is negative or the determination in step 126 is affirmative), image processing is completed.

Namely, in the image processing section 28 of the print server 12, both the color patch 42 for printing simulation and the color patch 44 for printer management can be printed out together with the image corresponding to the image data of the print job.

At this time, color correction corresponding to the characteristics of the printer 18 for printing out is carried out on the image data of the color patch 42 for printing simulation, in the same way as it is carried out on the image data of the print job. In this way, an appropriate color patch 42 for printing simulation, which corresponds to the printing environment, can be formed.

Further, the image data of the color patch for printer management is printed out without being subjected to color correction. Thus, a color patch for printer management, which makes it possible to correctly grasp the characteristics of the printer 18, can be formed.

Moreover, by designating overwriting, the color patch for which overwriting is designated is not hidden by the image of the print job. Thus, accurate printing simulation and management of the printer 18, which utilize the color patches, are possible.

Next, with reference to FIG. 6, description will be given of an example of processing at the time when the images of the color patch 42 for printing simulation and the color patch 44 for printer management are managed as raster data.

In this flowchart, first, in step 130, on the basis of the drawing command of the print job, RIP processing is carried out and raster data is generated.

Thereafter, in step 132, it is confirmed whether or not setting of printing of the color patch 42 for printing simulation has been carried out. When a setting has been made to print the color patch 42 for printing simulation, the determination in step 132 is affirmative, and the routine move on to step 134.

In step 134, it is confirmed whether or not overwriting has been designated. When a designation to overwrite the color patch 42 for printing simulation has been given, the determination in step 134 is affirmative, and the routine moves on to step 136.

In step 136, the raster data of the color patch 42 for printing simulation stored in the HD 36 is read-out, and this raster data is composed so as to be overwritten on a predetermined position on the raster data of the print job.

Further, if no designation to overwrite the color patch 42 for printing simulation has been given, the determination in step 134 is negative, and the routine moves on to step 138. In step 138, the raster data of the color patch 42 for printing simulation is read-out, and the raster data of the print job is overwritten and composed such that the raster data of the color patch 42 for printing simulation is at a predetermined position. Namely, image composition is carried out so that the raster data of the color patch 42 for printing simulation is layered beneath the raster data of the print job.

In this way, when image composition of the color patch 42 for printing simulation is completed, the routine moves on to step 140, and color correction of the image data is carried out. Namely, color correction on the raster data is carried out. Note that, when printing of the color patch 42 for printing simulation is not set, the determination in step 132 is negative, and the routine moves on to step 140.

Thereafter, in step 142, it is confirmed whether printing of the color patch 44 for printer management has been set. If printing of the color patch 44 for printer management has been set, the determination in step 142 is affirmative, and the routine moves on to step 144.

In step 144, it is confirmed whether there is a designation to overwrite the color patch 44 for printer management. When overwriting of the color patch 44 for printer management has been designated, the determination in step 144 is affirmative, and the routine moves on to step 146.

In step 146, the raster data of the color patch 44 for printer management is read-out, and this raster data is composed so as to be overwritten on a predetermined position on the raster data of the print job.

Further, if there is no designation to overwrite the color patch 44 for printer management, the determination in step 144 is negative and the routine moves on to step 148. The raster data of the color patch 44 for printer management is read-out, and the raster data of the print job is overwritten and composed such that the raster data of the color patch 44 for printer management is at a predetermined position. Namely, image composition is carried out such that the raster data of the color patch 44 for printer management is layered beneath the raster data of the print job, and image processing is completed. Note that, when printing of the color patch 44 for printer management is not set, the determination in step 142 is negative, and image processing is completed.

By carrying out image processing in this way, the color patch 42 for printing simulation or the color patch 44 for printer management is recorded, in accordance with the settings at the client terminal 14, on a predetermined position of the recording paper 38 on which the image of the print job is formed. In this way, printed output, which enables accurate printing simulation, is obtained.

Figure 6:
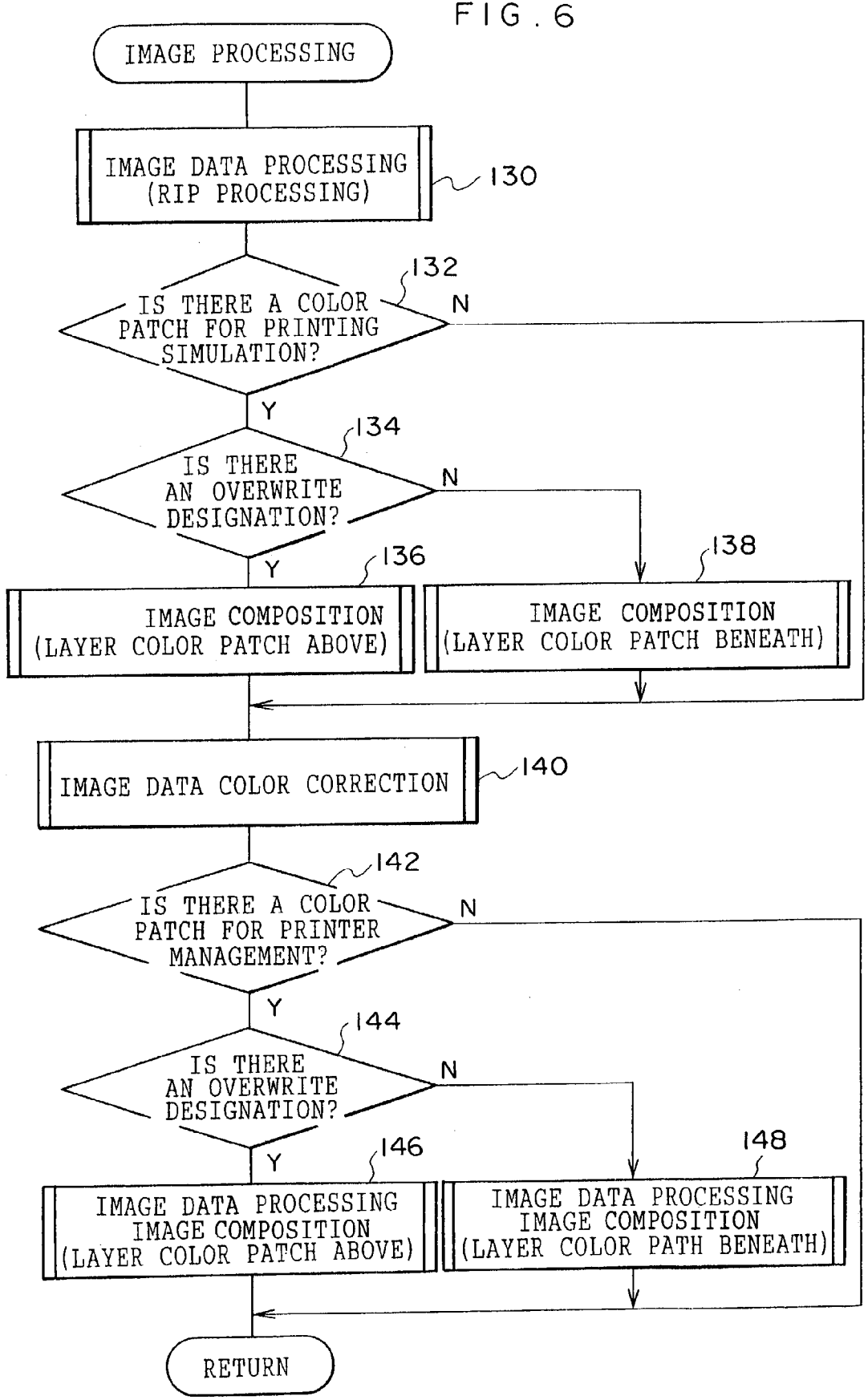
FIG. 6 is a flowchart showing a summary of the processings at the time of composing the color patch for printing simulation and the color patch for printer management, which are managed as raster data.

In the explanation of FIG. 6, after the color patch 42 for printing simulation is composed, color correction is carried out, and thereafter, the color patch 44 for printer management, for which color correction is not carried out, is composed. However, the correction region may be designated and color correction may be carried out after the color patch 44 for printer management has been composed.

Figure 7:
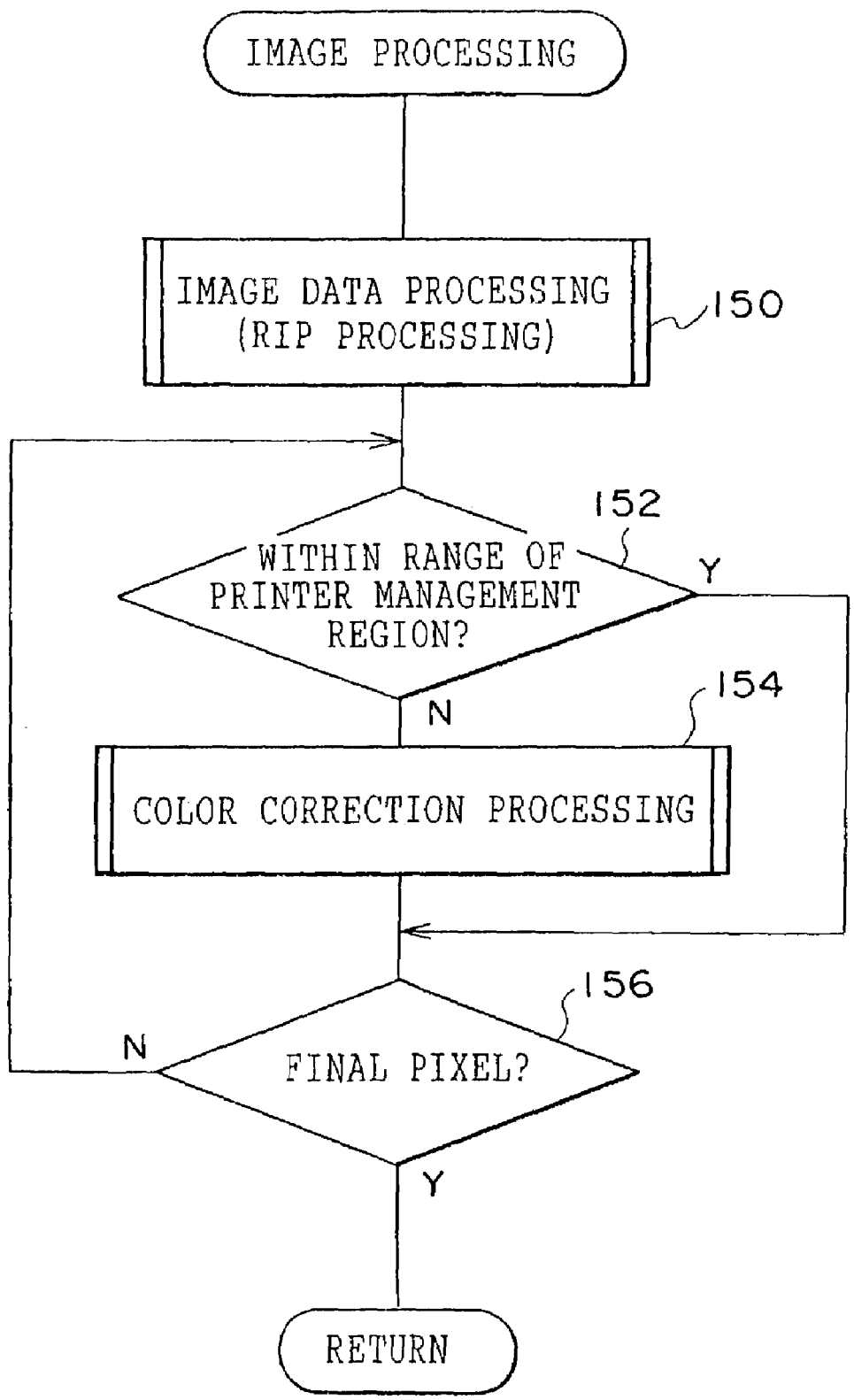
FIG. 7 is a flowchart showing an example of processing at the time that a region is designated and color correction is carried out.

FIG. 7 shows a summary of image processing which carries out color correction except on the region of the color patch 44 for printer management.

In this flowchart, in step 150, RIP processing is carried out on the image data of the print job. Image composition processing is carried out on the raster data generated by the RIP processing, so that the color patch 42 for printing simulation or the color patch 44 for printer management is recorded on a predetermined position of the recording paper 38 in accordance with the settings at the client terminal 14.

When image processing (RIP processing) is completed, color correction is carried out, for example, pixel-by-pixel. The region at which the color patch 44 for printer management is recorded is determined in advance. When carrying out color correction, it is confirmed, for each pixel, whether the pixel is in the region where the color patch 44 for printer management is recorded. Color correction is carried out only on pixels outside of the region where the color patch 44 for printer management is recorded.

Namely, in step 152, an initial pixel which is set in advance is extracted. In subsequent step 154, it is judged whether this pixel is in the region where the color patch 44 for printer management is recorded.

Here, when the pixel is outside of the region where the color patch 44 for printer management is recorded, the determination in step 152 is negative. The routine moves on to step 154 where color correction is carried out on this pixel.

Further, for pixels of the region where the color patch 44 for printer management is recorded, the determination in step 152 is negative. Without carrying out color correction, the routine moves on to step 156 where it is judged whether this pixel is the final pixel. If the final pixel has not yet been reached, the determination in step 156 is negative, and the routine moves on to step 152 where processing on the next pixel is carried out.

In this way, a region where color correction is to be carried out (or a region where color correction is not to be carried out) is set, and color correction is carried out only on the pixels of the region where color correction is to be carried out. In this way, even if the color patch 44 for printer management is composed in advance with the image data (the drawing command or the raster data), the color patch 44 for printer management can be formed on the recording paper 38 by colors corresponding to the operating state of the printer 18.

In this way, in the print server 12 which is used as the image processing device in the present embodiment, when printing of the color patch 44 for printer management has been set, color correction is not carried out on the color patch 44 for printer management. Thus, the characteristics and operating state of the printer 18 can be judged accurately.

Further, in the print server 12, the color patch 42 for printing simulation can be recorded together with the color patch 44 for printer management. At this time, color correction is carried out on the color patch 42 for printing simulation in the same way as on the image based on the print job. Thus, an accurate printing simulation is possible.

Note that the above-described embodiments are not intended to limit the structure of the present invention. For example, in the present embodiments, the print settings for the color patch 42 for printing simulation and the color patch 44 for printer management are carried out at the client terminal 14. However, these print settings may be carried out at the print server 12.

In the present embodiments, the color patch 42 for printing simulation and the color patch 44 for printer management are recorded in the margin of the recording paper 38. However, because it is possible to designate whether or not overwriting is to be carried out, the color patch 42 for printing simulation and the color patch 44 for printer management can both be recorded at arbitrary positions.

Moreover, in the present embodiments, description is given of a case in which each of the color patch 42 for printing simulation and the color patch 44 for printer management is either stored in the HD 36 or inputted from the client terminal 14. However, the present invention is not limited to the same, and the color patches 42, 44 may be generated each time at the color patch generating section 34.

In the present embodiments, description is given of a case in which the present invention is applied to the print server 12 of the network 10. However, the present invention is not limited to the same, and may be applied to an image processing device of an arbitrary structure connected to a network.

As described above, in accordance with the present invention, an excellent effect is achieved in that an appropriate simulation corresponding to the printing environment of the image data or the drawing data can be carried out. Further, in accordance with the present invention, it is possible to select a processing for carrying out color correction in accordance with the timing for composing the management image for printing simulation and the management image for the output device. Thus, appropriate management of the output device can be carried out on the basis of a second color management image.

What is claimed is:

1. An image processing device receiving data of an image which is an object of printing, and subjecting the image data to processing for printing, said image processing device comprising:

first image generating means for generating first image data of a first image having a predetermined pattern;

second image generating means for generating second image data of a second image having a predetermined pattern;

first image composing means for composing the image data of the object of printing and the first image data;

color correcting means for carrying out color correction on the image data of the object of printing and the first image data; and second image composing means for composing image data, which have been composed by the first image composing means, and the second image data.

2. The image processing device of claim 1, wherein the first image is an image for management for printing simulation, and the second image is an image for management of an output device.

3. The image processing device of claim 1, wherein at least one of the image data of the object of printing, the first image data and second image data are drawing data expressed by drawing commands.

4. The image processing device of claim 1, wherein at least one of the image data of the object of printing, the first image data and second image data are raster image data.

5. The image processing device of claim 1, wherein the first image composing means composes the image data of the object of printing and the first image data generated by the first image generating means, and thereafter, the color correcting means carries out color correction on the composed image data.

6. The image processing device of claim 1, wherein the color correcting means carries out color correction on each of the image data of the object of printing and the first image data, and thereafter, the first image composing means composes the image data of the object of printing and the first image data.

7. The image processing device of claim 1, wherein the color correcting means carries out color correction of a predetermined region on image data composed by the second image composing means.

8. The image processing device of claim 7, wherein the predetermined region is a region other than a region where the second image is printed.

9. The image processing device of claim 1, wherein the first and second image generating means include storing means for storing the first and second image data.

10. An image processing system comprising:
an image processing terminal providing image data of an image, which is an object of printing; and
an image processing device receiving the image data from the image processing terminal, and subjecting the image data to processing for printing,
wherein the image processing device includes:
first image generating means for generating first image data of a first image having a predetermined pattern;
second image generating means for generating second image data of a second image having a predetermined pattern;
first image composing means for composing the image data of the object of printing and the first image data;
color correcting means for carrying out color correction on the image data of the object of printing and the first image data; and
second image composing means for composing image data, which have been composed by the first image composing means, and the second image data.

11. The image processing system of claim 10, wherein the image processing terminal has means for instructing generation of the first and second images, and the first and second image generating means generate the first and second image data on the basis of setting of the means for instructing.

12. The image processing system of claim 10, wherein the image processing terminal has means for instructing composing of the first and second images, and the first and second image composing means compose the first and second image data on the basis of setting of the means for instructing.

13. The image processing system of claim 10, wherein the first image is an image for management for printing simulation, and the second image is an image for management of an output device.

14. The image processing system of claim 10, wherein at least one of the image data of the object of printing, the first image data and second image data are drawing data expressed by drawing commands.

15. The image processing system of claim 10, wherein the first image composing means composes the image data of the object of printing and the first image data generated by the first image generating means, and thereafter, the color correcting means carries out color correction on the composed image data.

16. The image processing system of claim 10, wherein the color correcting means carries out color correction on each of the image data of the object of printing and the first image data, and thereafter, the first image composing means composes the image data of the object of printing and the first image data.

17. The image processing system of claim 10, wherein the color correcting means carries out color correction of a region other than a region where the second image is printed, on image data composed by the second image composing means.

18. An image processing system comprising:
an image processing terminal providing image data of an image, which is an object of printing, the image processing terminal including first image generating means for generating first image data of a first image having a predetermined pattern, and second image generating means for generating second image data of a second image having a predetermined pattern; and
an image processing device receiving the image data from the image processing terminal, and subjecting the image data to processing for printing, wherein the image processing terminal sends the first and second image data to the image processing device together with the image data of the object of printing, and the image processing device receives the first and second image data together with the image data of the object of printing and has
first image composing means for composing the image data of the object of printing and the first image data;
color correcting means for carrying out color correction on the image data of the object of printing and the first image data; and
second image composing means for composing image data, which have been composed by the first image composing means, and the second image data.

19. The image processing system of claim 18, wherein the first image is an image for management for printing simulation, and the second image is an image for management of an output device.

20. The image processing system of claim 18, wherein at least one of the image data of the object of printing, the first image data and second image data are drawing data expressed by drawing commands.

* * * * *